United States Patent [19]
Challberg et al.

[11] Patent Number: 5,353,320
[45] Date of Patent: Oct. 4, 1994

[54] REACTOR PRESSURE VESSEL NOZZLE

[75] Inventors: Roy C. Challberg, Livermore; Hubert A. Upton, Morgan Hill, both of Calif.

[73] Assignee: General Electric Company, San Jose, Calif.

[21] Appl. No.: 43,068

[22] Filed: Apr. 5, 1993

[51] Int. Cl.$^5$ .............................................. G21C 13/02
[52] U.S. Cl. ..................................... 376/294; 376/282
[58] Field of Search ............... 376/294, 282, 281, 277, 376/204, 292; 976/DIG. 171, DIG. 173; 220/581, 661; 138/44

[56] References Cited

U.S. PATENT DOCUMENTS

| | | | |
|---|---|---|---|
| 3,774,645 | 11/1973 | Pompa | 138/44 |
| 4,174,734 | 11/1979 | Bradham | 138/44 |
| 4,369,893 | 1/1983 | Pennell et al. | 976/DIG. 171 |
| 5,207,977 | 5/1993 | Desai | 376/294 |

OTHER PUBLICATIONS

F. J. Moody, "Maximum Discharge Rate of Liquid-Vapor Mixtures from Vessels," Sep. 1975, pp.: Cover, title, Disclaimer, and 1-10, GE report.

*Primary Examiner*—Daniel D. Wasil
*Attorney, Agent, or Firm*—J. S. Beulick

[57] ABSTRACT

A nozzle for joining a pool of water to a nuclear reactor pressure vessel includes a tubular body having a proximal end joinable to the pressure vessel and a distal end joinable in flow communication with the pool. The body includes a flow passage therethrough having in serial flow communication a first port at the distal end, a throat spaced axially from the first port, a conical channel extending axially from the throat, and a second port at the proximal end which is joinable in flow communication with the pressure vessel. The inner diameter of the flow passage decreases from the first port to the throat and then increases along the conical channel to the second port. In this way, the conical channel acts as a diverging channel or diffuser in the forward flow direction from the first port to the second port for recovering pressure due to the flow restriction provided by the throat. In the backflow direction from the second port to the first port, the conical channel is a converging channel and with the abrupt increase in flow area from the throat to the first port collectively increase resistance to flow therethrough.

16 Claims, 2 Drawing Sheets

REACTOR PRESSURE VESSEL NOZZLE

The U.S. Government has rights in this invention in accordance with Contract No. DE-AC03-90SF18494 awarded by the Department of Energy.

The present invention relates generally to nuclear reactors, and, more specifically, to a nozzle joining a reactor pressure vessel to a water pool.

BACKGROUND OF THE INVENTION

In one type of nuclear reactor being developed, i.e., simplified boiling water reactor (SBWR), various pools of water are provided in the containment building surrounding a reactor pressure vessel which provide various functions, including providing makeup water to the pressure vessel in the event of a postulated loss of coolant accident (LOCA). The pressure vessel contains a nuclear reactor core which is effective for boiling water therein to generate steam under pressure which is conventionally discharged from the pressure vessel to provide a source of power to a steam turbine-generator, for example, for producing electrical power. In the event of a break in one of the several pipes joined to the pressure vessel, water and steam will leak from the pressure vessel, which will drop the level of water therein available for cooling the reactor core unless suitable provisions are made to provide makeup water into the pressure vessel.

For example, a conventional boiling water reactor power plant includes a wetwell or suppression pool of water in the containment building surrounding the pressure vessel. The suppression pool provides various functions during the operation of the power plant, including, for example, being joined in flow communication to the pressure vessel by a suitable conduit extending from the suppression pool to a corresponding inlet nozzle joined to the pressure vessel. In the event of a LOCA condition, a suitable valve is opened for allowing water to flow by gravity from the suppression pool into the pressure vessel to provide makeup water therein.

In order to provide additional makeup water during a LOCA condition, the SBWR design further includes a gravity driven cooling system (GDCS) which has a corresponding GDCS pool of water elevated above the suppression pool which is similarly joined to a corresponding inlet nozzle on the pressure vessel for selectively providing makeup water thereto upon opening of a suitable valve in the supply pipe therebetween. In both the GDCS pool and the suppression pool, it is desirable to have makeup water provided to the pressure vessel solely by gravity flow to avoid reliance on power operated pumps which could be rendered inoperative in the event of a power failure.

However, since water supply lines must necessarily be provided between the pressure vessel and both the GDCS pool and the suppression pool, a break in one of these lines would also cause a loss of coolant accident as well as possibly disable their use for providing makeup water to the pressure vessel.

Accordingly, it is desired to join inlet nozzles on the pressure vessel to the suppression pool and the GDCS pool with supply lines having minimum resistance to the gravity flow of makeup water from these pools in a forward flow direction into the pressure vessel in the event of a LOCA condition, but, a competing consideration requires relatively high flow resistance in the event of a break of one of these supply lines for restricting back flow of water from the reactor through these inlet nozzles.

SUMMARY OF THE INVENTION

A nozzle for joining a pool of water to a nuclear reactor pressure vessel includes a tubular body having a proximal end joinable to the pressure vessel and a distal end joinable in flow communication with the pool. The body includes a flow passage therethrough having in serial flow communication a first port at the distal end, a throat spaced axially from the first port, a conical channel extending axially from the throat, and a second port at the proximal end which is joinable in flow communication with the pressure vessel. The inner diameter of the flow passage decreases from the first port to the throat and then increases along the conical channel to the second port. In this way, the conical channel acts as a diverging channel or diffuser in the forward flow direction from the first port to the second port for recovering pressure due to the flow restriction provided by the throat. In the backflow direction from the second port to the first port, the conical channel is a converging channel which with the abrupt increase in flow area from the throat to the first port, will, increase resistance to flow therethrough.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

Illustrated schematically in FIG. 1 is an elevational, sectional view of an exemplary boiling water reactor contained in a pressure vessel and disposed within a containment building having pools of water joined in flow communication with respective nozzles of the pressure vessel in accordance with the present invention.

DESCRIPTION OF THE PREFERRED EMBODIMENT(S)

Figure 1:
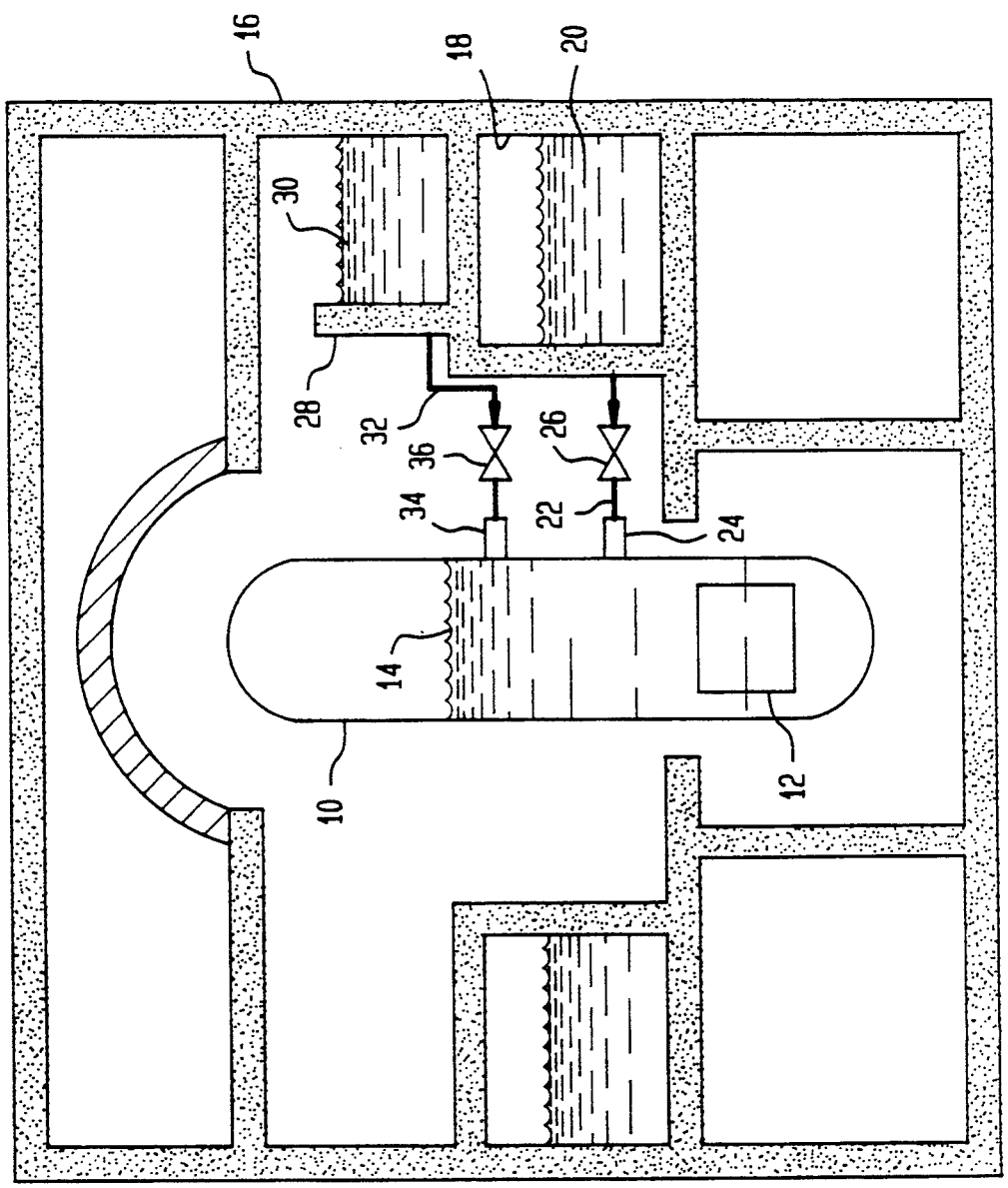

Illustrated schematically in FIG. 1 is an exemplary pressure vessel 10 containing a conventional boiling water reactor core 12 submerged in reactor water 14. Other conventional details inside the pressure vessel 10 are not illustrated for clarity of presentation. The pressure vessel 10 is conventionally disposed in a containment building 16 which includes among other things a conventional annular wetwell or suppression pool 18 which surrounds the pressure vessel 10 and is disposed at a suitable elevation above the reactor core 12. The suppression pool 18 contains water 20 which is used for various functions in the normal operation of the power plant. For example, a first supply pipe or line 22 is joined at one end to the suppression pool 18 and at an opposite end to a first inlet nozzle 24 on the pressure vessel 10 and includes a first valve 26 for controlling the flow of water 20 from the suppression pool 18 by gravity into the pressure vessel 10 in the event of loss of coolant accident (LOCA). In the event of a LOCA, the pressure vessel 10 is conventionally depressurized and the first valve 26 is opened for allowing gravity flow of the water 20 into the pressure vessel 10. During normal operation, the first valve 26 is closed and prevents flow through the first supply line 22.

The exemplary embodiment illustrated in FIG. 1 is representative of a simplified boiling water reactor (SBWR) wherein the containment building 16 further includes a gravity-driven cooling system (GDCS) which has a GDCS pool 28 containing water 30 disposed at an elevation above both the suppression pool 18 and the reactor core 12. A second supply pipe or line 32 is joined at one end in flow communication with the GDCS pool 28 and at an opposite end to a second inlet nozzle 34 of the pressure vessel 10 disposed at an elevation above the first nozzle 24. Disposed in the second supply pipe 32 is a conventional second valve 36 which is selectively openable, before opening the first valve 26, for allowing the water 30 in the GDCS pool 28 to flow by gravity through the second supply pipe 32 and into the pressure vessel 10 through the second nozzle 34 following a LOCA condition. During normal operation, the second valve 36 is closed.

Both the suppression pool 18 and the GDCS pool 28 are conventionally used to provide makeup water into the pressure vessel 10 in the event of a LOCA wherein the break occurs in any of the various pipes (not shown) leading to the pressure vessel 10 except, however, for a break in either of the first and second supply lines 22, 32 themselves. Since the normal level of water within the pressure vessel 10 is higher than the elevation of the first and second nozzles 24, 34, a leak in the supply lines 22, 32 between the nozzles 24, 34 and the respective valves 26, 36 will allow the reactor water 14 to escape from the vessel 10. However, in accordance with the present invention, each of the nozzles 24, 34 has a preferred configuration to provide a relatively low flow resistance and pressure drop in the normal, forward flow direction from the respective pools 18, 28 to the vessel 10, and a relatively large resistance to flow in the backflow direction from the pressure vessel 10 through the nozzles 24, 34. In this way, the nozzles 24, 34 allow gravity draining of the pools 18, 28 into the pressure vessel 10 following a LOCA without substantial flow resistance to provide makeup water into the vessel 10, but in the event of a LOCA created in the supply lines 22, 32 themselves, a substantial flow resistance is created for reducing leakage of the reactor water 14 from the pressure vessel 10 through the respective nozzles 24 or 34.

Figure 2:
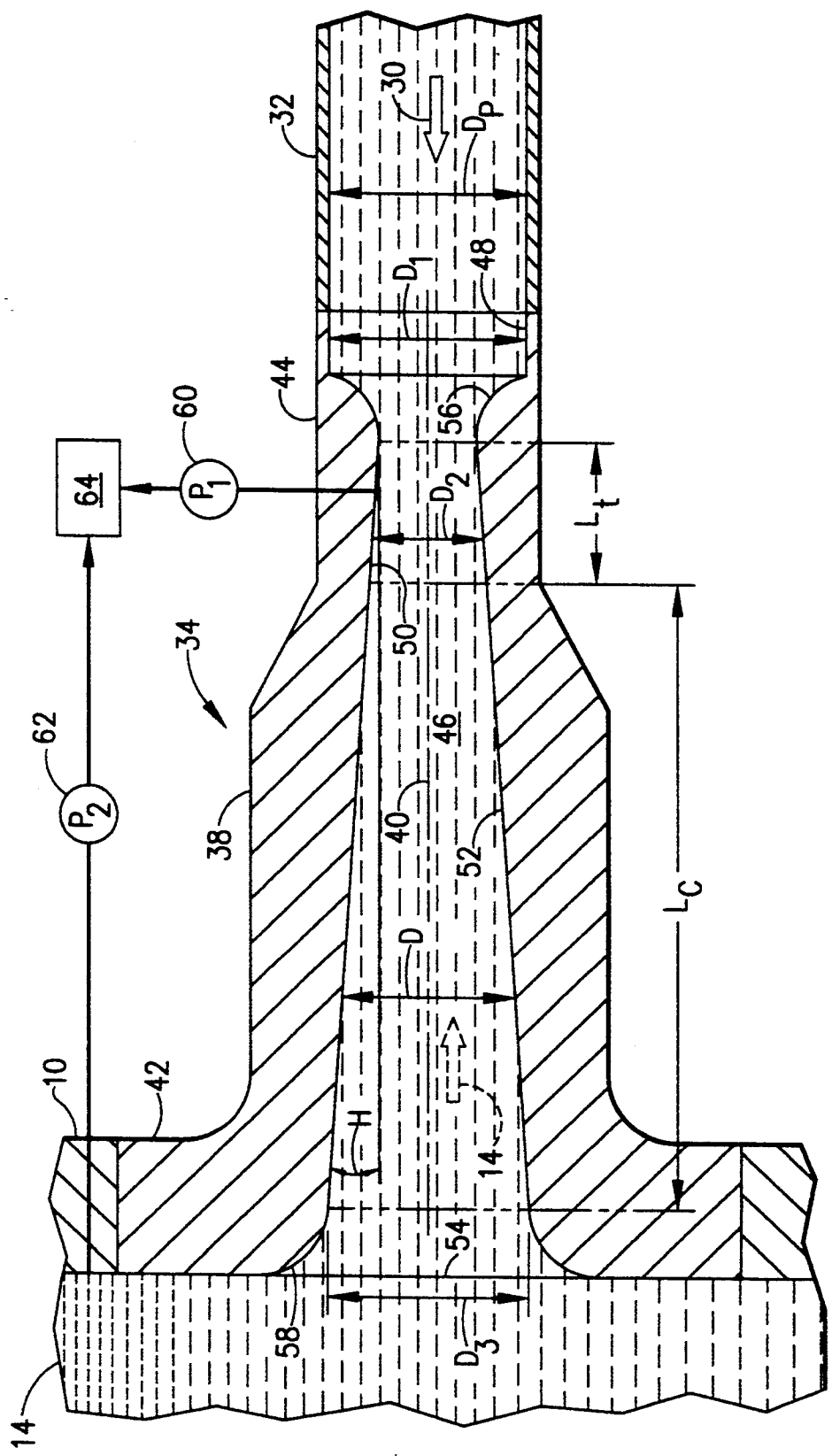
FIG. 2 is a sectional view of an exemplary one of the nozzles joining the pool to the pressure vessel illustrated in FIG. 1 configured in accordance with one embodiment of the present invention.

Illustrated in cross-section in FIG. 2 is an exemplary embodiment of the second inlet nozzle 34 joined to the pressure vessel 10 and the second supply pipe 32 in accordance with one embodiment of the present invention. The first nozzle 24 is identical to the second nozzle 34 except for specific dimensions, with the description of the second nozzle 34 applying equally as well to the first nozzle 24.

The nozzle 34 includes a tubular body 38 having a longitudinal or axial centerline axis 40 and a proximal end 42 adapted for being fixedly joined to the pressure vessel 10. In the exemplary embodiment illustrated in FIG. 2, the proximal end 42 has a larger diameter than that of the main body 38 and is conventionally welded into the wall of the pressure vessel 10. The body 38 also includes a distal end 44 adapted for being joined to the supply pipe 32, and in the exemplary embodiment illustrated in FIG. 2, the distal end 44 is cylindrical and conventionally welded to the cylindrical supply pipe 32.

Extending completely axially through the body 38 is an annular or preferably circular flow channel or passage 46 which includes several portions in serial flow communication from the distal end 44 to the proximal end 42, all disposed coaxially about the centerline axis 40. The portions include an annular first port or inlet 48 at the distal end 44 which is disposed in flow communication with the supply pipe 32 when the distal end 44 is welded thereto. The first port 48 has a first inner diameter $D_1$ which is constant for a suitable axial distance to provide a substantially constant flow area preferably equal to that of the supply pipe 32. The supply pipe 32 has an inner diameter $D_p$ which, therefore, is preferably substantially equal to the first inner diameter $D_1$ of the first port 48.

The flow passage 46 further includes a throat 50 spaced axially from the first port 48 which has a second inner diameter $D_2$ which is less than the first inner diameter $D_1$ to provide backflow resistance through the nozzle 34. A conical channel 52 extends axially from one end thereof at the throat 50 to an opposite end thereof adjacent the nozzle proximal end 42 and has an inner diameter D which increases axially from one end at the throat 50, i.e., $D_2$, to a maximum or third inner diameter $D_3$ at its opposite end. A second port or outlet 54 is disposed at the nozzle proximal end 42 and is joined in flow communication with the pressure vessel 10.

Accordingly, in the event of a LOCA condition, forward flow of the water 30 from the GDCS pool 28 (see FIG. 1) occurs through the nozzle 34 illustrated in FIG. 2 from the supply pipe 32 at the right to the pressure vessel 10 at the left as represented by the flow arrow labeled 30. The water, therefore, flows through the throat 50 of decreased flow area, which causes flow resistance and a corresponding pressure drop, but then continues to flow through the conical channel 52 which in the forward flow direction to the left as illustrated in FIG. 2 is a diverging channel or diffuser having a preferred half-angle H selected for obtaining diffusion of the water 30 to maximize recovery of the pressure drop resulting from the throat 50 for improving the flow rate of the water 30 in the forward direction into the pressure vessel 10 without flow separation from the walls of the channel 52.

However, in the event of a LOCA caused by a break in the supply pipe 32 upstream from the nozzle 34, the reactor water 14 will enter the second port 54 for flow outwardly from the vessel 10 through the nozzle 34 to the site of the break in the supply pipe 32. Since in this backflow direction to the right in FIG. 2, as represented by the phantom arrow labeled 14, the conical channel 52 is a converging channel, it provides increasing resistance to the discharge of the reactor water 14 therethrough, with the throat 50 and first port 48 providing additional pressure losses in the backflow. Although the throat 50 provides a smaller flow area than that of the supply pipe 32, the preferred configuration of the nozzle 34 provides more resistance to flow in the backflow direction from the nozzle 34 than in the forward flow direction into the nozzle 34. In this way, the GDCS pool 28 may be designed to provide a predetermined flow rate of water 30 through the nozzle 34 and into the pressure vessel 10 by gravity, but in the event of a backflow condition through the nozzle 34, resistance to leakage of the reactor water 14 therethrough is provided.

In the preferred embodiment, the throat 50 has a substantially constant flow area for a predetermined axial throat length $L_t$, with the second inner diameter $D_2$ being the same for the entire length of the throat 50. The preferred length $L_t$ of the throat 50 is at least 10 cm so that the conventionally known homogeneous flow model may be used to calculate blowdown flow rates from the pressure vessel 10. Since the pressure vessel 10 is normally under relatively high pressure and contains steam therein in addition to the reactor water 14, discharge of the reactor water 14 from the vessel 10 through the nozzle 34 will cause the water 14 to flash boil and form steam bubbles. The throat 50 is so configured for ensuring the generation of an equilibrium saturated mixture of steam and water (homogeneous mixture) being discharged from the nozzle 34 into the supply pipe 32.

Furthermore, the conical channel 52 is preferably straight with its sidewalls having linearly varying diameters between its two ends over its axial length $L_C$. In this way, a substantially uniform rate of diffusion is provided in the forward flow direction of the water 30 from the first port 48 and out through the second port 54 for maximizing pressure recovery in the water 30. And, in the backflow direction from the second port 54 and out the first port 48, the decreasing flow area correspondingly increases the pressure drop and, therefore, resistance to flow of the reactor water 14 therethrough. Also in the preferred embodiment, the axial length $L_C$ of the conical channel 52 and the third inner diameter $D_3$ at its largest end are selected to ensure that flow in the forward direction into the vessel 10 does not separate from the walls of the channel 52 to maximize pressure recovery.

In order to further reduce pressure losses in the water 30 in the forward direction through the nozzle 34 into the vessel 10, the flow passage 46 further includes a first bellmouth 56 integrally joining the first port 48 to the throat 50 for providing a relatively smooth transition of decreasing flow area in the forward flow direction from the first port 48 to the throat 50. And, the flow passage 46 further includes a second bellmouth 58 integrally joining the conical channel 52 to the second port 54 to provide a relatively smooth discharge from the channel 52 into the vessel 10 with the second bellmouth 58 increasing in diameter in the forward flow direction from the channel 52 to the second port 54. In a preferred and exemplary embodiment of the present invention, the conical channel 52 has a half-angle H of about 3.8° for the first nozzle 24 and 4.05° for the second nozzle 34 for obtaining maximum pressure recovery from the forward flow of the water 20, 30, while still providing an effective*amount* of backflow resistance to the reactor water 14 through the nozzles 24, 34 in the event of a leak downstream therefrom.

Accordingly, the nozzle 34 provides relatively low resistance to flow in the normal or inward flow direction with recovery of pressure through the diverging channel 52, while, in the reverse or outward direction from the nozzle 34, provides the necessary restriction in flow by a simple reduction in flow area and ensures a homogeneous bubbly mixture of reactor water 14 and flash steam to further increase backflow resistance.

Referring again to FIG. 1, the first nozzle 24 is disposed at an elevation below the second nozzle 34 and is therefore subject to higher head pressure in the reactor water 14 in the vessel 10. The first nozzle 24 may be configured substantially identically to the second nozzle 34 illustrated in FIG. 2 except, however, the respective diameters of the flow passage 46 thereof are preferably made smaller than in the second nozzle 34 to further increase the backflow resistance against the higher driving pressure force of the reactor water 14 in the vessel 10.

Since the nozzle 34 includes the throat 50, the nozzle 34 may be used if desired to measure the normal forward water flow through the nozzle 34 from the GDCS pool 28. A first conventional pressure sensor 60 may be preferably operatively mounted in the throat 50 for measuring the pressure, $P_1$ therein. And, a second conventional pressure sensor 62 may be operatively joined to the pressure vessel 10 for measuring the pressure $P_2$ therein, adjacent to the nozzle second port 54. The difference in pressure $P_1-P_2$ may be determined in a conventional comparator 64 which is effective for providing a flow value proportional to the pressure differential.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

We claim:

1. In a water-cooled nuclear reactor comprising:
a core of nuclear fuel;
a reactor pressure vessel containing said nuclear fuel core therein and comprising an inlet;
containment spaced outwardly from and surrounding said reactor pressure vessel;
a pool of water located within said containment and outside said reactor pressure vessel at an elevation which is higher than an elevation of said nuclear fuel core; and
means for channeling water from said pool to said inlet of said reactor pressure vessel by the force of gravity in response to a predetermined condition inside said reactor, said water channeling means comprising a supply pipe having a flow passage of first diameter extending from a first end to a second end thereof, said second end of said supply pipe flow passage being in flow communication with said pool via said first end of said supply pipe flow passage; and a nozzle having a flow passage extending from a first end to a second end, said first end of said nozzle flow passage being in flow communication with said first end of said supply pipe flow passage via said second end of said supply pipe flow passage and being in flow communication with said inlet of said reactor pressure vessel via said second end of said nozzle flow passage, the improvement wherein:
said nozzle flow passage comprises a throat and first and second sections in flow communication with said throat, said throat having a second diameter which is smaller than said first diameter, said first section having the shape of a bell mouth which changes gradually in diameter from said first diameter to said second diameter, and said second section having the shape of a truncated cone having a minimum diameter substantially equal to said second diameter, said first section being situated between said throat and said supply pipe and said second section being situated between said throat and said inlet of said reactor pressure vessel.

2. The nuclear reactor as defined in claim 1, wherein said throat has said second diameter for a length of at least 10 cm.

3. The nuclear reactor as defined in claim 1, wherein said second section has a maximum diameter which is less than a diameter of said inlet, and said nozzle flow passage further comprises a third section situated between said second section and said inlet, said third section having the shape of a bell mouth which changes gradually in diameter from said maximum diameter of said second section to said inlet diameter.

4. The nuclear reactor as defined in claim 3, wherein said nozzle flow passage further comprises a fourth section situated between said throat and said supply pipe, said fourth section having the shape of a circular cylinder of said first diameter.

5. The nuclear reactor as defined in claim 1, wherein said second section has a half-angle of about 4°.

6. In a water-cooled nuclear reactor comprising:
 a core of nuclear fuel;
 a reactor pressure vessel containing said nuclear fuel core therein and comprising an inlet;
 containment spaced outwardly from and surrounding said reactor pressure vessel;
 a pool of water located within said containment and outside said reactor pressure vessel at an elevation which is higher than an elevation of said nuclear fuel core; and
 means for channeling water from said pool to said inlet of said reactor pressure vessel by the force of gravity in response to a predetermined condition inside said reactor, said water channeling means comprising a supply pipe having a flow passage of first diameter extending from a first end to a second end thereof, said second end of said supply pipe flow passage being in flow communication with said pool via said first end of said supply pipe flow passage; and a nozzle having a flow passage extending from a first end to a second end, said first end of said nozzle flow passage being in flow communication with said first end of said supply pipe flow passage via said second end of said supply pipe flow passage and being in flow communication with said inlet of said reactor pressure vessel via said second end of said nozzle flow passage, the improvement wherein:
 said flow passage has a circular cross section at every point along its length, said circular cross section having a diameter which varies in accordance with a predetermined geometry, said predetermined geometry being selected such that the resistance of said nozzle flow passage to the flow of water from said first end to said second end of said nozzle flow passage is less than the resistance of said nozzle flow passage to the flow of water from said second end to said first end of said nozzle flow passage.

7. The nuclear reactor as defined in claim 6, wherein said nozzle flow passage comprises a throat and first and second sections in flow communication with said throat, said throat having a second diameter which is smaller than said first diameter, said first section having the shape of a bell mouth which changes gradually in diameter from said first diameter to said second diameter, and said second section having the shape of a truncated cone having a minimum diameter substantially equal to said second diameter, said first section being situated between said throat and said supply pipe and said second section being situated between said throat and said inlet of said reactor pressure vessel.

8. The nuclear reactor as defined in claim 7, wherein said throat has said second diameter for a length of at least 10 cm.

9. The nuclear reactor as defined in claim 7, wherein said second section has a maximum diameter which is less than a diameter of said inlet, and said nozzle flow passage further comprises a third section situated between said second section and said inlet, said third section having the shape of a bell mouth which changes gradually in diameter from said maximum diameter of said second section to said inlet diameter.

10. The nuclear reactor as defined in claim 9, wherein said nozzle flow passage further comprises a fourth section situated between said throat and said supply pipe, said fourth section having the shape of a circular cylinder of said first diameter.

11. The nuclear reactor as defined in claim 7, wherein said second section has a half-angle of about 4°.

12. A reactor pressure vessel comprising an inlet in flow communication with a nozzle, said nozzle having a flow passage extending from a first end to a second end, said first end of said nozzle flow passage being in flow communication with said inlet of said reactor pressure vessel via said second end of said nozzle flow passage, wherein said nozzle flow passage comprises a throat and first and second sections in flow communication with said throat, said throat having a predetermined diameter, said first section having the shape of a bell mouth which gradually decreases in diameter from a first diameter to said predetermined diameter, and said second section having the shape of a truncated cone having a minimum diameter substantially equal to said predetermined diameter, said first section being situated between said throat and said first end of said nozzle flow passage and said second section being situated between said throat and said inlet.

13. The reactor pressure vessel as defined in claim 12, wherein said throat has said predetermined diameter for a length of at least 10 cm.

14. The reactor pressure vessel as defined in claim 12, wherein said second section has a maximum diameter which is less than a diameter of said inlet, and said nozzle flow passage further comprises a third section situated between said second section and said inlet, said third section having the shape of a bell mouth which changes gradually in diameter from said maximum diameter of said second section to said inlet diameter.

15. The reactor pressure vessel as defined in claim 14, wherein said nozzle flow passage further comprises a fourth section situated between said throat and said first end of said nozzle flow passage, said fourth section having the shape of a circular cylinder of said first diameter.

16. The reactor pressure vessel as defined in claim 12, wherein said second section has a half-angle of about 4°.

* * * * *